Nov. 23, 1954  H. S. JANDUS  2,694,945
FOOT OPERATED BRAKE LEVER
Filed Dec. 8, 1950  2 Sheets-Sheet 1

Inventor
Herbert S. Jandus
by Hill, Sherman, Meroni, Gross & Simpson Attys

Nov. 23, 1954 H. S. JANDUS 2,694,945
FOOT OPERATED BRAKE LEVER
Filed Dec. 8, 1950 2 Sheets-Sheet 2
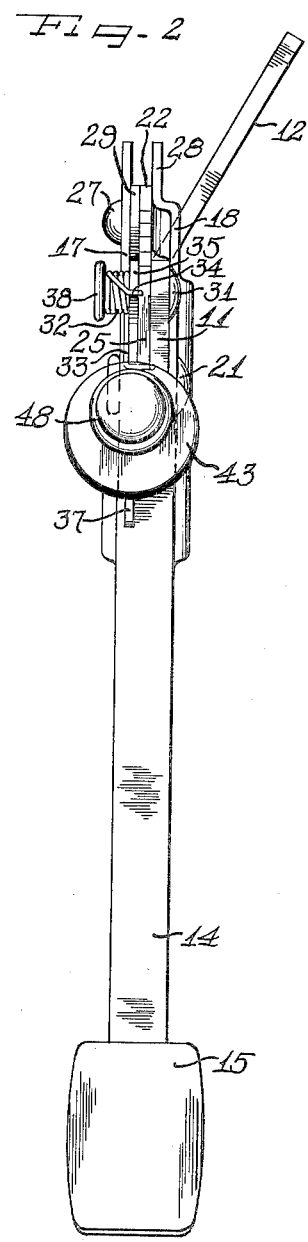
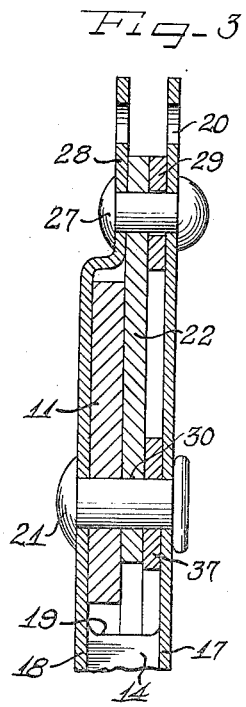
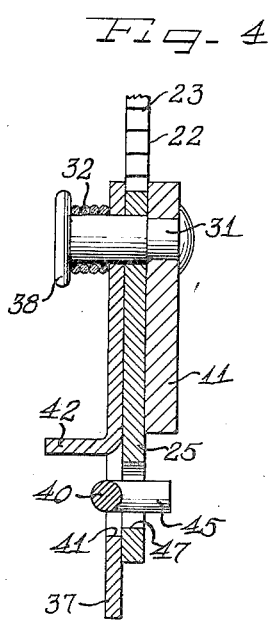
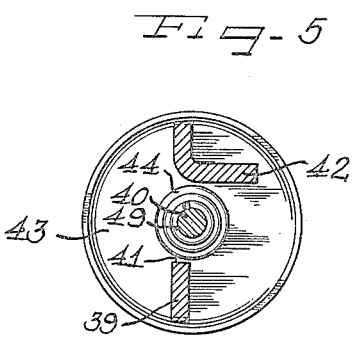
Inventor
Herbert S. Jandus
by Hill, Sherman, Meroni, Gross & Simpson Attys

United States Patent Office 2,694,945
Patented Nov. 23, 1954

2,694,945

FOOT OPERATED BRAKE LEVER

Herbert S. Jandus, Detroit, Mich., assignor to Houdaille-Hershey Corporation, Detroit, Mich., a corporation of Michigan Application December 8, 1950, Serial No. 199,862

4 Claims. (Cl. 74—542)

The present invention relates to improvements in foot operated brake levers and more particularly to brake levers of the type that are adapted to be used for emergency or parking brakes.

An important object of the present invention is to provide an efficient, low cost foot pedal operated brake lever construction.

Another object of the invention is to provide an improved releasable pawl and ratchet mechanism for a foot-operated brake lever structure.

A further object is to provide a novel unitary brake lever structure that can be manufactured and sold as a unit complete for quick assembly in a vehicle with which the brake lever is to be used.

Other objects, features and advantages of the present invention will be readily apparent from the following detailed description of a preferred embodiment thereof taken in conjunction with the accompanying drawings, in which:

Figure 2 is a front elevational view of the brake lever assembly;

Figure 3 is an enlarged sectional detail view taken substantially on the line III—III of Fig. 1;

Figure 4 is an enlarged fragmentary detail sectional view taken substantially on the line IV—IV of Fig. 1; and Figure 5 is an enlarged fragmentary detail sectional view taken substantially on the line V—V of Fig. 1.

Figure 1:
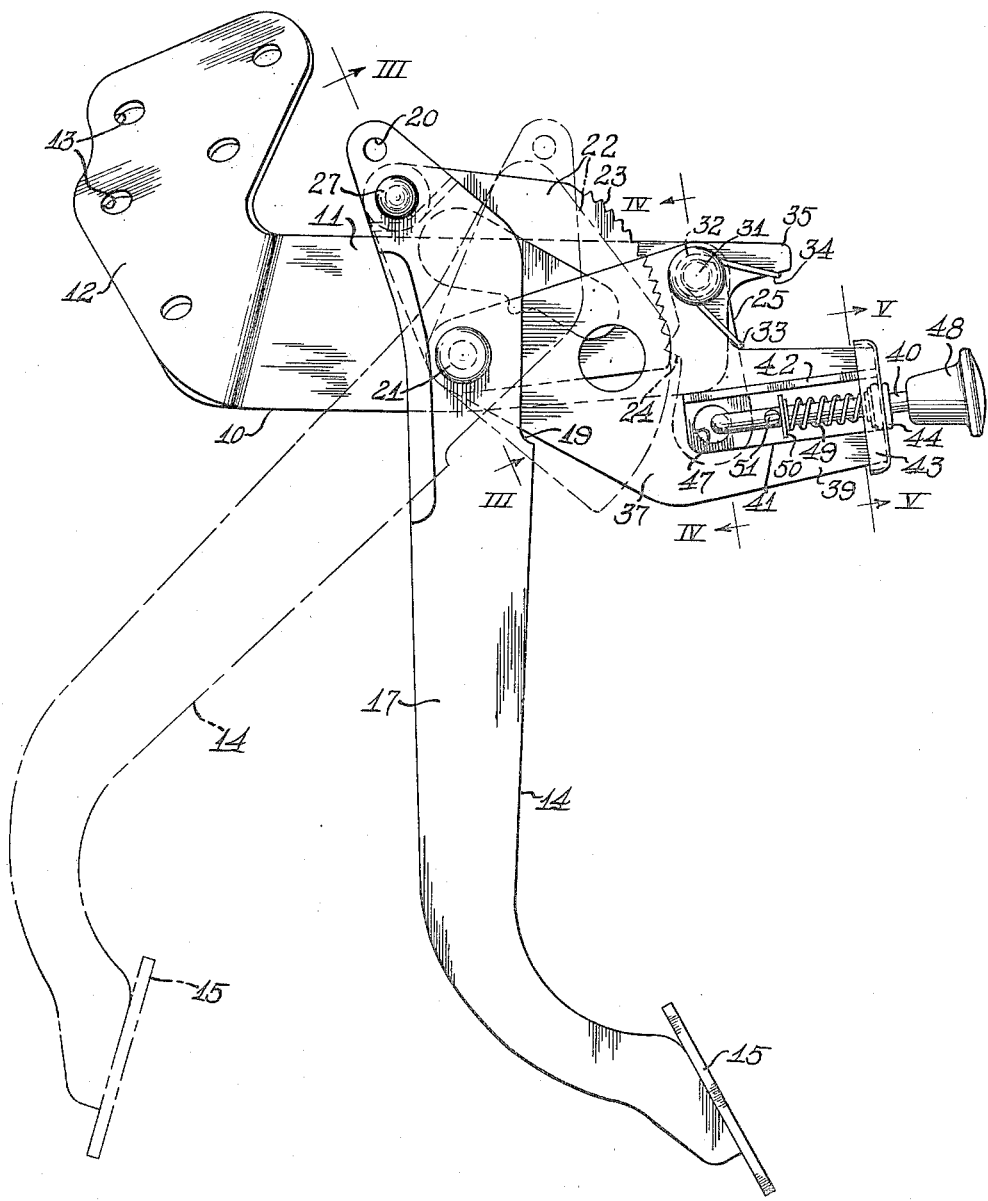
Figure 1 is a side elevational view of a brake lever assembly embodying the features of the present invention.

A brake lever assembly or unit according to the present invention is of the kind that is prefabricated as a complete unit ready for installation in the vehicle with which it is to be used and adapted to be mounted in a convenient position for operation by the foot of the operator of the vehicle, with a manual release mechanism for releasing the brake from a set position to which it has been foot-maneuvered by the operator.

By way of example, the brake lever unit as shown in the drawings comprises a mounting bracket 10 which may be formed as a stamping from relatively heavy gauge sheet metal and includes a flat elongated body portion 11 and an attachment head portion 12. The body portion 11 is adapted to be disposed in a vertical plane and is elongated in a front to rear direction, while the head portion 12 may, as shown in Figs. 1 and 2, be angled to provide an attachment flange generally conforming to an angular portion of the fire wall or dash panel of an automobile or the like, being provided with a plurality of screw or bolt holes 13.

Pivotally mounted intermediate the ends of the bracket body 11, is a foot-operated brake lever 14 including a lower pedal 15 facing generally rearwardly for actuation by the foot of an operator of the vehicle with which the unit is associated. By preference the foot lever 14 is formed from suitable sheet metal in generally a U cross section with the channel thus formed opening forwardly and defined by a left side flange or panel 17 and a right side flange or panel 18. The upper end portions of the side wall flanges 17 and 18 lie in generally spaced parallel relation and with the rear or web portion of the body of the foot lever cut out as indicated at 19 so that the upper wall portions can straddle the bracket body 11. The upper portions of the lever side walls 17 and 18 project substantially above the upper edge of the bracket body 11 and are provided with coaxial apertures 20 by which a connector for the end of a brake setting cable (not shown) can be attached to the upper end of the foot brake.

A pivot for the brake lever 14 is provided by a pin or rivet 21 extending through the lever walls 17 and 18 and the bracket body 11. Thereby, the foot brake lever 14 is adapted to swing between the full line and dot-dash outline positions of Fig. 1 representing, respectively, a brake released position and a brake setting position.

Novel means are provided for retaining the foot brake lever 14 in brake setting position, and for manually releasing the brake lever from the brake setting position as desired. To this end, the head end portion of the lever carries a sector plate 22 provided with an arcuate series of ratchet teeth 23 on its rear edge cooperative with a detent tooth 24 on a pawl member 25 carried by the rear end portion of the bracket body 11. By preference, the ratchet sector 22 is mounted slidably alongside the bracket body 11 between the side wall flanges 17 and 18 of the brake lever and has an upper forward end portion fixedly secured between the upper end portions of the lever wall members 17 and 18 as by means of a rivet 27 (Figs. 1 and 3). In the present instance the right side wall flange of the brake lever is slidably disposed in face-to-face relation to the right face of the bracket body 11 while the sector 22 bears slidably against the opposite or left face of the body plate 11, and the upper end portion of the right side wall flange is inset as indicated at 28 to compensate for the thickness of the bracket body and to lie in face-to-face relation with the engaged portion of the sector 22. A predetermined spaced relation between the side wall panel or flange 17 of the brake lever and the adjacent side of the sector 22 is maintained by a spacer washer 29 disposed about the shank of the rivet 27. The forward lower portion of the sector 22 is provided with a bearing aperture 30 through which the shank of the pivot rivet 21 traverses the sector to maintain a fixed relationship of the sector in cooperation with the securing rivet 27 with respect to the lever 14 so that the sector also swings about the pivot 21 in the swinging movements of the lever 14. Thus both the lever and the sector are pivotally attached to the bracket body 11 and the sector is positively secured to the brake lever so that the sector is compelled to swing jointly with the brake lever.

By preference, the pawl 25 is formed as a heavy gauge metal stamping of vertically elongated from and flat to lie slidably against the same face of the bracket body 11 that is slidably engaged by the sector 22 so that the pawl will lie in the same plane as the sector. By preference both the pawl and sector are formed from material of the same thickness. A pivotal connection of the pawl 25 with the bracket plate body 11 is afforded by a pivot pin or rivet 31 (Figs. 1 and 4) traversing the upper end portion of the pawl and the upper rear portion of the bracket body.

Biasing means comprising a torque spring 32 is provided for normally biasing the pawl 25 for ratcheting of the detent prong or tooth 24 thereon with the ratchet teeth 23 of the sector. For this purpose, the torque spring 32 is coiled about an extending portion of the shank of the attachment and pivot rivet 31 projecting to one side of the bracket body and pawl assembly, and preferably to the left side of the assembly. The torque spring 32 has a pair of tensioned arms one arm 33 of which engages the pawl at its rear edge spaced substantially below the pawl pivot and acts to drive the pawl forwardly into the ratcheting position. A second arm 34 of the spring 32 serves as a tensioning arm and engages under an anchoring lug 35 projecting rearwardly from the upper portion of a plate member 37 (Figs. 1 and 2).

In addition to serving as a spring tension arm anchor, the plate member 37 also serves the purpose of supporting manual pawl release mechanism. For this purpose, the plate member 37 is preferably supported in the assembly at the side of the pawl 25 opposite to the bracket body 11 by the same rivet 31 that provides the pivot for the pawl. From this connection in the assembly, the plate 37 projects forwardly and has a forward end portion secured in place between the sector 22 and the left side flange of the foot lever by means of the pivot rivet 21 (Fig. 3). In practice a fairly loose sliding fit relationship of the parts may be provided and the coiled portion of the spring 32 bearing between a rivet head 38 on the rivet 31 and the upper rear end portion of the plate 37 maintains a rattlefree assembly of the bracket body 11, the pawl 25, the sector 22 and the plate 37.

A rearwardly projecting lower portion of the plate 37 is equipped to support a release pull rod 40. For this purpose, the plate portion 39 is longitudinally slotted as at 41 to provide clearance for the pull rod and the material struck out in providing the slot 41 is formed to provide a lateral longitudinally extending reinforcing flange 42. Secured as by welding or brazing to the rear end of the plate portion 39 and the rear end portion of the flange 42 is an escutcheon plate 43 supporting centrally a grommet 44 through which the pull rod 40 is slidably disposed, as best seen in Figs. 1 and 5.

At its forward end portion, the pull rod 40 has a hooked terminal 45 which extends into interengagement with the lower end portion of the pawl 25 through an aperture 47 provided in the pawl (Figs. 1 and 4). At its rear end, the pull rod 40 has convenient manipulating means such as a knob 48 by which it is adapted to be grasped and pulled rearwardly when it is desired to swing the pawl 25 rearwardly in opposition to the spring biasing leg 33 of the biasing spring to release the pawl from the ratchet teeth 23 of the sector for releasing the brake lever 14 and thereby release the brake with which the lever assembly is associated. It will be apparent that the bracket 10 is to be mounted at a level so that the knob 48 is at a level convenient to the hand of the operator of the vehicle, which will be termed the hand level of the vehicle, while the brake lever 14 is of a length to extend from such hand level to a level where the foot pedal may be conveniently operated by the foot of the operator of the vehicle, herein termed the foot level of the vehicle.

By preference, a return spring 49 is provided for the pawl releasing pull rod 40, in this instance comprising a coiled compression spring encircling the pull rod and bearing at its rear end against the grommet 44 while at the forward end the spring bears against a shoulder provided by a washer 50 disposed about an intermediate portion of the shank of the pull rod and retained in place by a pin 51 carried by the shank of the pull rod. Through this arrangement over-stressing of the torque spring 32 is avoided, and positive return of the pull rod is assured even though something may happen to the torsion spring 32.

After the brake lever assembly has been installed in a vehicle, and the emergency or parking brake cable has been attached to the upper end portion of the foot lever 14, the brake is easily set by pushing against the treadle or pedal portion 15 to swing the lower portion of the lever forwardly and the upper portion of the lever rearwardly, the sector 22 and the pawl 25 functioning to retain the lever in the brake setting position. When it is desired to release the brake the pull rod 40 is pulled rearwardly to release the pawl 25 and thereby release the brake, the tension of the brake cable pulling on the upper end portion of the lever 14 causing the lever to swing to the released position.

It will be understood that modifications and variations may be effected without departing from the scope of the novel concepts of the present invention.

I claim as my invention:

1. In combination in a foot-operated brake lever assembly, a flat body bracket, a foot-operated lever slidably engaging said body bracket, a foot pedal on said lever, a pivot member connecting the lever and the body bracket, a ratchet sector plate slidably engaging the opposite side of the body bracket and pivotal about said pivot member, means securing the ratchet plate to the lever for swinging with the lever, a flat pawl pivotally secured in slidable relation to the same side of the body bracket as the ratchet plate and rearwardly therefrom and cooperating retainingly with the ratchet plate, a carrying plate slidably engaging the ratchet plate and said pawl and attached to the body bracket by the pivot connections of the lever and the pawl, and manually operable pawl release means carried by said carrying plate rearwardly from said pawl pivot, said foot-operated lever being of length to extend from the foot level of a vehicle to the hand level thereof for mounting of said bracket at the hand level and for mounting of said foot pedal at the foot level in said vehicle.

2. In combination in a brake lever assembly of the character described, a bracket, a foot-operated brake lever pivoted on said bracket, a foot pedal on said lever, a ratchet sector secured for pivotal movement with the lever, a pawl secured for pivotal movement to said bracket and cooperable with the ratchet sector, a plate connected to the bracket by the pivots for the lever and the pawl and in slidable relation to said pawl, said plate having a slot therein, an escutcheon at one end of said slot, and a pull rod guided by said escutcheon and operating in said slot to cooperate with the pawl for manual release of the pawl from the ratchet sector, said foot-operated brake lever being of length to extend from the foot level of a vehicle to the hand level thereof for mounting of the bracket at the hand level and for mounting of the foot pedal at the foot level in the vehicle.

3. In combination in a brake lever assembly of the character described, a flat bracket plate, a foot pedal lever, a ratchet sector plate, a supporting plate, a common attachment member securing the lever and ratchet sector plate pivotally to the bracket plate and the supporting plate in position on the bracket plate, a pawl member interposed between said supporting plate and the bracket plate, and cooperable with the ratchet sector plate, a pivot member securing the pawl pivotally to the bracket plate and the supporting plate further to the bracket plate, a manual release carried by said supporting plate and cooperating with the pawl for releasing the same, and biasing means carried by said pivot member and biasing the pawl into operative relation to the ratchet sector plate and also biasing the supporting plate into non-rattling relation to the pawl and ratchet sector plate, said foot pedal lever being of length to extend from the foot level of a vehicle to the hand level thereof for mounting of the bracket plate at the hand level in the vehicle.

4. In combination in a brake lever assembly prefabricated as a complete unit ready to be mounted in a motor vehicle at about hand high level forwardly of the vehicle operator's position, a supporting bracket structure having a portion thereof adapted to be secured fixedly to the vehicle, an operatively depending lever having a foot pedal at the lower end portion thereof facing rearwardly and having the upper end portion thereof pivotally connected to said bracket structure for front to rear swinging movement, a ratchet member attached to the upper end portion of the lever for movement therewith in the swinging of the lever and having ratchet teeth thereon projecting generally rearwardly, a portion of said bracket structure projecting rearwardly substantially beyond said ratchet teeth, a spring biased pawl mounted upon said rearwardly projecting portion of the bracket structure separate from the lever and retainingly engageable selectively with the ratchet teeth to hold the lever in incremental forwardly swung positions of the foot pedal portion thereof responsive to forward foot pressure thereagainst, an upstanding portion on the upper portion of the lever swingable rearwardly as the lower portion of the lever is swung forwardly and having means for attachment thereto of a brake operating cable which will normally tend to draw the upper portion of the lever forwardly and thereby tend to swing the lower pedal portion of the lever rearwardly, and a manual release member carried by the rearwardly projecting portion of the bracket structure and extending rearwardly for manual operation, said release member being operatively connected to the pawl so that operation of the release member will be effective to release the pawl from said teeth and thereby enable release of the brakes after the same have been set by forwardly pushing on said foot pedal.

References Cited in the file of this patent

UNITED STATES PATENTS

| Number | Name | Date |
|---|---|---|
| Re. 14,944 | Walker | Aug. 31, 1920 |
| 1,823,695 | Moorhouse | Sept. 15, 1931 |
| 2,119,638 | Klampferer | June 7, 1938 |
| 2,280,644 | Dickerson | Apr. 21, 1942 |
| 2,288,169 | McCarthy | June 30, 1942 |
| 2,308,898 | Skareen | Jan. 19, 1943 |
| 2,467,557 | Jandus | Apr. 19, 1949 |
| 2,520,759 | Duma | Aug. 29, 1950 |

FOREIGN PATENTS

| Number | Country | Date |
|---|---|---|
| 185,304 | Great Britain | Sept. 7, 1922 |
| 661,723 | Germany | June 25, 1938 |